(12) United States Patent
Chawla et al.

(10) Patent No.: US 7,406,606 B2
(45) Date of Patent: Jul. 29, 2008

(54) METHOD AND SYSTEM FOR DISTINGUISHING RELEVANT NETWORK SECURITY THREATS USING COMPARISON OF REFINED INTRUSION DETECTION AUDITS AND INTELLIGENT SECURITY ANALYSIS

(75) Inventors: Anil Jagdish Chawla, Evans, GA (US); David Perry Greene, Ossining, NY (US); Klaus Julisch, Horgen (CH); Aaron Edward Fredrick Rankin, Norwood, PA (US); Jonathan Michael Seeber, Cambridge, MA (US); Rhys Ulerich, Johnstown, PA (US)

(73) Assignee: International Business Machines Corporation, Armonk, NY (US)

( * ) Notice: Subject to any disclaimer, the term of this patent is extended or adjusted under 35 U.S.C. 154(b) by 871 days.

(21) Appl. No.: 10/821,042

(22) Filed: Apr. 8, 2004

(65) Prior Publication Data
US 2005/0229253 A1 Oct. 13, 2005

(51) Int. Cl.
G06F 9/00 (2006.01)
(52) U.S. Cl. .................. 713/194; 713/188; 713/189
(58) Field of Classification Search ............. 713/194, 713/188, 189
See application file for complete search history.

(56) References Cited

U.S. PATENT DOCUMENTS

2004/0073800 A1 4/2004 Shah

FOREIGN PATENT DOCUMENTS

WO  WO 03/100617 A1  12/2003

OTHER PUBLICATIONS

Anthes, Gary H., "Computerizing Common Sense"; Computerworld, www.computerworld.com/news/2002/story/0,11280,69881,00. html; Apr. 8, 2002; Computerworld, Inc., U.S.A.
Statsoft; "Cluster Analysis"; www.statsoftinc.com/textbook/stcluan. html; 2003; StatSoft, Inc., U.S.A.
Cycorp, "overview of CycSecure"; www.cyc.com/cyc/applications/cycsecure; 2004; Cycorp, Inc. U.S.A.
PCT/US05/10358; International Search Report, USPTO, Sep. 21, 2006.

*Primary Examiner*—Thomas R Peeso
(74) *Attorney, Agent, or Firm*—Carr LLP; D'Ann Rifai

(57) ABSTRACT

An apparatus, a method, and a computer program are provided for distinguishing relevant security threats. With conventional computer systems, distinguishing security threats from actual security threats is a complex and difficult task because of the general inability to quantify a "threat." By the use of an intelligent conceptual clustering technique, threats can be accurately distinguished from benign behaviors. Thus, electronic commerce, and Information Technology systems generally, can be made safer without sacrificing efficiency.

4 Claims, 3 Drawing Sheets

METHOD AND SYSTEM FOR DISTINGUISHING RELEVANT NETWORK SECURITY THREATS USING COMPARISON OF REFINED INTRUSION DETECTION AUDITS AND INTELLIGENT SECURITY ANALYSIS

BACKGROUND OF THE INVENTION

1. Field of the Invention

The present invention relates generally to network security and, more particularly, to the use of conceptual clustering in order to determine and eliminate potential security threats.

2. Description of the Related Art

Due to the increased reliance on Information Technology (IT) in the present business arena, there is an ever-increasing need to protect the IT infrastructure. In protecting the IT infrastructure, Network Security has become a paramount issue. There is a need to protect the IT infrastructure for a variety of reasons, such as to limit down-time and provide secure data transmission.

However, implementation of security measures is not a simple task. For an IT system, the basic approach to security is to monitor traffic across the IT network to identify patterns that indicate system intrusion. There are a variety of methodologies that may be employed to identify intrusion patterns, such as regression analysis and certain inductive techniques. Generally, the security approaches monitor usage behaviors and requests of network ports and resources in order to determine potential intrusion risks. For example, certain requests at certain times of day or night can be indicative of a system attack. Thus, pattern analysis can be employed to make such determinations. However, methods of attacks are neither finite nor static. Instead, methods of attacks change. Hence, pattern analyses must be updated to at least maintain equal footing or at least a semblance of parity with those who mean to cause harm to the IT infrastructure.

In addition, as the volume of events occurring on a network increases relative to a generally lower volume of actual intrusions, the difficulty in determining threats correspondingly increases. The space can be simplified, but if the space is too general, the patterns will trigger false positives, needlessly interrupting system operation, wasting management resources and degrading system reliability.

Therefore, a need exists for a method and/or apparatus for utilizing qualitative and quantitative measurements to improve the degree of accuracy in analyzing potential security risks that addresses at least some of the problems associated with convention methods and apparatuses associated with current security algorithms.

SUMMARY OF THE INVENTION

The present invention provides an apparatus for determining computer security threats to an Information Technology (IT) infrastructure. A network scanner utilizes at least one taxonomy to determine a possible intrusion. An intrusion detector detects at least one actual intrusion. A false-positive/true-positive (FPTP) detector compares the determined possible intrusion with the detected actual intrusion to update the taxonomy.

BRIEF DESCRIPTION OF THE DRAWINGS

For a more complete understanding of the present invention and the advantages thereof, reference is now made to the following descriptions taken in conjunction with the accompanying drawings, in which.

DETAILED DESCRIPTION

In the following discussion, numerous specific details are set forth to provide a thorough understanding of the present invention. However, those skilled in the art will appreciate that the present invention may be practiced without such specific details. In other instances, well-known elements have been illustrated in schematic or block diagram form in order not to obscure the present invention in unnecessary detail. Additionally, for the most part, details concerning network communications, electromagnetic signaling techniques, and the like, have been omitted inasmuch as such details are not considered necessary to obtain a complete understanding of the present invention, and are considered to be within the understanding of persons of ordinary skill in the relevant art.

It is further noted that, unless indicated otherwise, all functions described herein may be performed in either hardware or software, or some combinations thereof. In a preferred embodiment, however, the functions are performed by a processor such as a computer or an electronic data processor in accordance with code such as computer program code, software, and/or integrated circuits that are coded to perform such functions, unless indicated otherwise.

Figure 1:
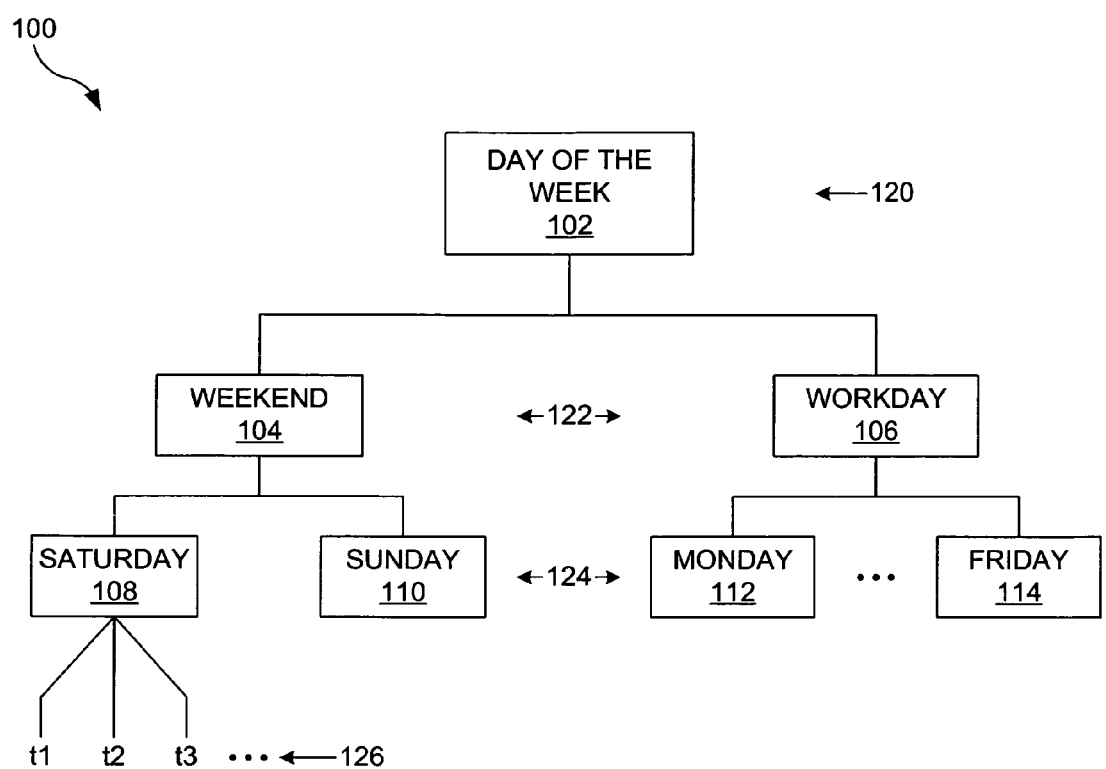
FIG. 1 is a block diagram depicting a sample taxonomy.

Referring to FIG. 1 of the drawings, the reference numeral 100 generally designates block diagrams depicting a sample taxonomy. The taxonomy 100 comprises a first level 120, a second level 122, a third level 124, and a fourth level 126. The first level 120 further comprises a day of the week category 102. The second level 122 further comprises a weekend category 104 and a workday category 106. The third level further comprises a Saturday category 108, a Sunday category 110, a Monday category 112, and a Friday category 114. The fourth level 126 further comprises a first timestamp t1, a second timestamp t2, and a third timestamp t3.

In forming the taxonomy, each of the varying levels are interrelated. Each of the timestamps t1, t2, and t3 occur at a specific time of the week. Therefore, each timestamp t1, t2, and t3 can be categorized as a specific day of the week, such as Saturday 108, and can be categorized as time of the week, such as a weekend 104. In other words, each of the subsequent levels are a single or multiple subsets of the previous levels.

Correspondingly, numerical values can be tied to each timestamp t1, t2, and t3 for the subset for which the timestamp belongs. This type of categorization is known as a "cluster" and its formulation is known as "clustering." The numerical values can then be used to determine threat levels. Security analyses typically require correlating combinations and sequences of events with a known intrusion. Because the number of possible combinations and sequences is enormous, it can be extremely difficult to identify useful patterns. Cluster analyses that utilize taxonomies, such as the sample taxonomy of FIG. 1, are an effective data-reduction tool for reducing the number of possible combinations and sequences to a size handled more quickly in real time. Clustering seeks to group objects into categories or clusters, wherein objects of a category have similar features.

Most pattern analyses work very well using quantitative or numeric measures of similarity and difference. However, many useful measures and patterns are qualitative or subjective, and therefore, do not have properties that make them readily amenable to measures of similarity or difference. For example, quantitative measures are difficult to apply consistently in determining the degree of similarity between a banana, a rock, and a yo-yo.

If a common measurement is considered in security, such as an IP address (e.g. 9.8.765.43), this "number" actually represents an identity. Different IP addresses can have different properties which can be meaningful from a security standpoint. For example, they represent a particular IP provider, a particular geography or day of the week, if the address is dynamic, as in FIG. 1.

Figure 2:
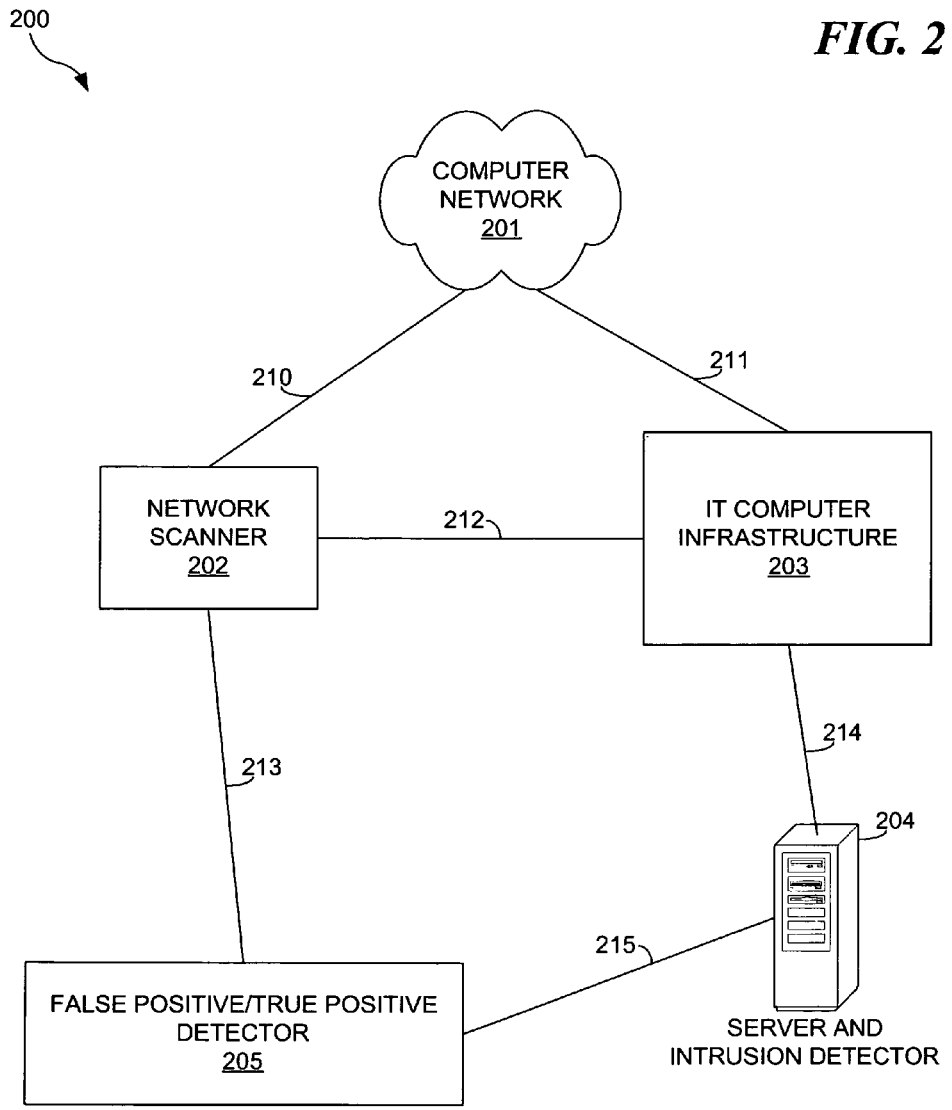
FIG. 2 is a block diagram depicting a system for distinguishing relevant security threats.

Referring to FIG. 2 of the drawings, the reference numeral 200 generally designates a block diagram depicting the system of distinguishing relevant security threats. The system 200 comprises a computer network 201, an Information Technology Computer (IT) Infrastructure 203, a server and intrusion detector 204, and a False Positive/True Positive Detector 205.

The computer network 201 is coupled to the Network Scanner 202 through a first communication channel 210. Also, the computer network 201 is coupled to the IT Computer Infrastructure 203 through a second communication channel 211. The computer network 201 may comprise any type, including, but not limited to, the Internet. Moreover, any of the aforementioned communications channels would encompass wireless links, packet switched channels, circuit switched or direct communication channels, any other channel of information transfer, as well as any combination of such channels. Furthermore, any of the aforementioned communication channels may be coupled to each component through multiple communications channels or a single communication channel, as shown in FIG. 2.

The network scanner 202 is another element of the system 200. The network scanner 202 provides threat assessment analysis of the IT Computer Infrastructure 203. The network scanner 202 is coupled to the IT Computer Infrastructure 203 through a third communication channel 212. The network scanner is also, coupled to the computer network 201 through the first communication channel 210. The network scanner 202 is additionally coupled to the false positive/true positive detector 205 through a fourth communication channel 213. Through simulation of attacks and a variety of other techniques, the network scanner is able to determine possible patterns for attacks. In other words, the network scanner 202 organizes observable data into meaningful structures or develops taxonomies. For example, detected usage from a specific company may not be useful in and of itself, but in conjunction with other data a correlation may be developed that corresponds to an attack. There are a number of services that provide network scanning and develop taxonomies, such as CycSecure® (a registered trademark and product of Cycorp, Inc., Suite 100, 3721 Executive Center Drive, Austin, Tex. 78731). Moreover, any of the aforementioned communications channels would encompass wireless lines, packet switched channels, direct communication channels, and any combination of the three. Furthermore, any of the aforementioned communication channels may be coupled to each component through multiple communications channels or a single communication, as shown in FIG. 2.

The IT Computer Infrastructure 203 is a component in need of protection. The IT Computer Infrastructure 203 is coupled to the computer network through the second communications channel 211. Also, the IT Computer Infrastructure 203 is coupled to the network scanner 202 through a third communication channel 212. The IT Computer Infrastructure 203 is also coupled to the server and intrusion detector 204 through a fifth communication channel 214. The IT Computer Infrastructure 203 can be composed of a single or multiple computers and/or servers. The IT Computer Infrastructure 203 also provides the framework that the business uses to operate. Moreover, any of the aforementioned communications channels would encompass wireless lines, packet switched channels, direct communication channels, and any combination of the three. Furthermore, any of the aforementioned communication channels may be coupled to each component through multiple communications channels or a single communication, as shown in FIG. 2.

The server and intrusion detector 204 monitors the IT Computer Infrastructure 203. The server and intrusion detector 204 is coupled to the IT Computer Infrastructure 203 through the fifth communication channel 214. Also, the server and intrusion detector 204 is coupled to the false positive/true positive detector 205 through a sixth communication channel 215. The server and intrusion detector monitors actual usage and attacks on the IT Computer Infrastructure 203 and generates network intrusion reports. Also, the server and intrusion detector 204 can relay comparative data from the false positive/true positive detector 205 to the IT Computer Infrastructure 203 to refine the semantic cluster analyses. Moreover, any of the aforementioned communications channels would encompass wireless lines, packet switched channels, direct communication channels, and any combination of the three. Furthermore, any of the aforementioned communication channels may be coupled to each component through multiple communications channels or a single communication, as shown in FIG. 2.

The false positive/true positive detector 205 is an updating component that increases the accuracy of threat assessment. The false positive/true positive detector 205 is coupled to the network scanner through the fourth communication channel 213. Also, the false positive/true positive detector 205 is coupled to the server and intrusion detector through the sixth communication channel 215. The false positive/true positive detector 205 compares the data generated from the network scanner 213 and the server and intrusion detector 204 to determine differentiate identified threats determined to be false positive from identified threats determined to be true positive. Once the differentiation of threats has been accomplished, the threats are prioritized and the defensive software of the IT Computer Infrastructure is updated. The method of threat analysis used by the false positive/true positive detector 205 is detailed below and in flow chart of FIG. 3. Moreover, any of the aforementioned communications channels would encompass wireless links, packet switched channels, circuit switched or direct communication channels, any other channel of information transfer, as well as any combination of such channels. Furthermore, any of the aforementioned communication channels may be coupled to each component through multiple communications channels or a single communication, as shown in FIG. 2.

Figure 3:
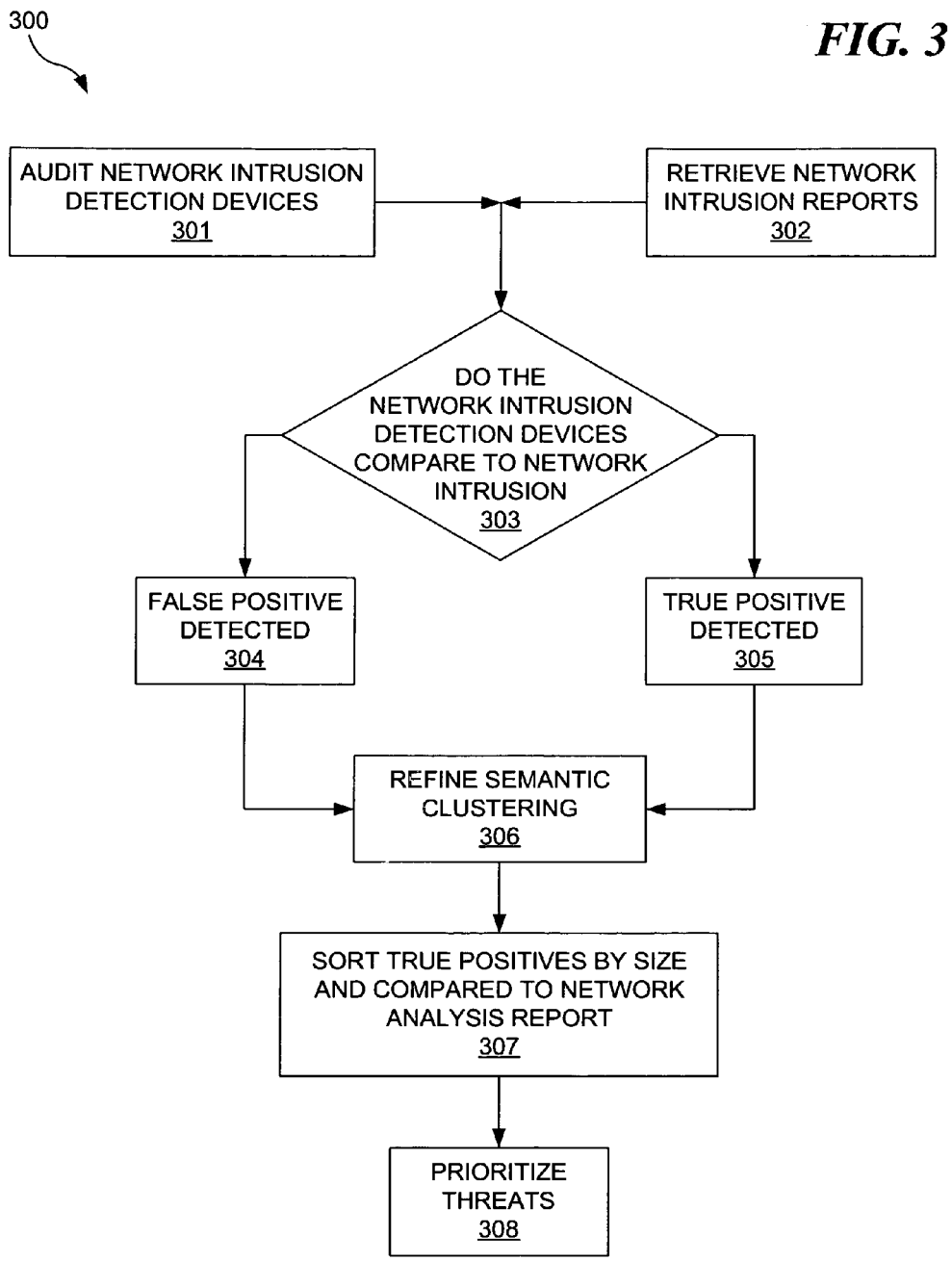
FIG. 3 is a flow chart depicting a method of distinguishing relevant security threats.

Referring to FIG. 3, the reference numeral 300 generally designates a flow chart depicting the method of distinguishing relevant security threats.

In step 301, the network intrusion detection devices are audited. The system 200 of FIG. 2 is enabled to monitor a variety of network scanning devices, such as the network scanner 202 of FIG. 2. The network scanner 202 of FIG. 2 performs threat assessment of the weakness of the defensive structure of the IT Computer Infrastructure 202 of FIG. 2. The false positive/true positive detector 205 of FIG. 2 audits the results of the network scanner 203 of FIG. 2 in order to obtain all possible threats determined through the threat assessment.

In step 302, the network intrusion reports are retrieved. The server and intrusion detector 204 of FIG. 2 makes actual measurements of intrusions and security lapses. From the monitoring of the system 200 of FIG. 2, the server and intrusion detector 204 of FIG. 2 generates a network intrusion report and forwards the report to the false positive/true positive detector 205 of FIG. 2.

In step 303, 304, and 305, the network intrusion report and the threat assessment are compared. The false positive/true positive detector 205 of FIG. 2 performs the comparison. By making the comparison, the false positive/true positive detector 205 of FIG. 2 can determine which of the assessed threats are actual threats and which assessed threats are benign. The false positive/true positive detector 205 of FIG. 2 then can label an assessed threat as false positive, in step 304, if the assessed threat is benign. Also, the false positive/true positive detector 205 of FIG. 2 can label an assessed threat as true positive, in step 305, if the assessed threat is an actual threat.

In steps 306, 307, and 308, the semantic clustering is refined. The defensive algorithm of the IT Computer Infrastructure 203 of FIG. 2 receives the labeled assessed threats in real-time from the false positive/true positive detector 205 of FIG. 2. The precise labeling allows for defensive algorithm to rapidly update the semantic clustering comprises the defensive algorithm to allow benign usages that may have been previously determined to, falsely, be actual security risks. Also, the true positives are sorted by size, in step 307, and are prioritized according to user defined priorities, in step 308. The organization of true positive security threats allows for better defense of the IT Computer Infrastructure 203 of FIG. 2. Therefore, the improved technique of FIG. 3 reduces the size of the pattern space and identifies potential threats without trigger to many false instances.

It will further be understood from the foregoing description that various modifications and changes may be made in the preferred embodiment of the present invention without departing from its true spirit. This description is intended for purposes of illustration only and should not be construed in a limiting sense. The scope of this invention should be limited only by the language of the following claims.

Having thus described the present invention by reference to certain of its preferred embodiments, it is noted that the embodiments disclosed are illustrative rather than limiting in nature and that a wide range of variations, modifications, changes, and substitutions are contemplated in the foregoing disclosure and, in some instances, some features: of the present invention may be employed without a corresponding use of the other features. Many such variations and modifications may be considered desirable by those skilled in the art based upon a review of the foregoing description of preferred embodiments. Accordingly, it is appropriate that the appended claims be construed broadly and in a manner consistent with the scope of the invention.

The invention claimed is:

1. An apparatus for determining computer security threats at least coupled to an Information Technology (IT) infrastructure, comprising:
   a network scanner, wherein the network scanner at least utilizes at least one taxonomy to determine at least one possible intrusion;
   an intrusion detector, wherein the intrusion detector at least detects at least one actual intrusion; and
   false-positive/true-positive (FPTP) detector, wherein the FPTP detector at least compares the at least one possible intrusion with the at least one actual intrusion in order to update the at least one taxonomy.

2. The apparatus of claim 1, wherein the FPTP detector further is at least configured to label the at least one possible intrusion as false-positive or true positive.

3. The apparatus of claim 2, wherein the FPTP detector is at least configured to sort possible intrusions labeled as true positive.

4. The apparatus of claim 2, wherein the FPTP detector is at least configured to prioritize possible intrusions labeled as true positive.

\* \* \* \* \*